US009426072B2

(12) United States Patent
Ratzin et al.

(10) Patent No.: US 9,426,072 B2
(45) Date of Patent: Aug. 23, 2016

(54) TRAFFIC FLOW CLASSIFICATION

(71) Applicant: Robin Systems, Inc., Milpitas, CA (US)

(72) Inventors: Rafit Izhak Ratzin, Los Gatos, CA (US); Krishna Satyasai Yeddanapudi, Pleasanton, CA (US); Dhanashankar Venkatesan, San Jose, CA (US)

(73) Assignee: ROBIN SYSTEMS, INC., San Jose, CA (US)

( * ) Notice: Subject to any disclaimer, the term of this patent is extended or adjusted under 35 U.S.C. 154(b) by 111 days.

(21) Appl. No.: 14/222,370

(22) Filed: Mar. 21, 2014

(65) Prior Publication Data

US 2015/0071072 A1   Mar. 12, 2015

Related U.S. Application Data

(60) Provisional application No. 61/876,045, filed on Sep. 10, 2013.

(51) Int. Cl.
| | |
|---|---|
| *H04L 12/801* | (2013.01) |
| *G06F 9/50* | (2006.01) |
| *G06F 9/455* | (2006.01) |
| *G06F 9/54* | (2006.01) |
| *H04L 12/851* | (2013.01) |
| *G06F 11/34* | (2006.01) |

(52) U.S. Cl.
CPC .............. *H04L 47/11* (2013.01); *G06F 9/455* (2013.01); *G06F 9/5038* (2013.01); *G06F 9/544* (2013.01); *G06F 9/546* (2013.01); *G06F 11/34* (2013.01); *H04L 47/2441* (2013.01); *G06F 11/3409* (2013.01); *G06F 11/3495* (2013.01); *G06F 2201/815* (2013.01)

(58) Field of Classification Search
CPC ....................................................... H04L 47/11
See application file for complete search history.

(56) References Cited

U.S. PATENT DOCUMENTS

| | | | | |
|---|---|---|---|---|
| 6,675,218 | B1 * | 1/2004 | Mahler | H04L 29/06 370/229 |
| 2006/0193295 | A1 * | 8/2006 | White | H04L 12/5692 370/336 |
| 2011/0085461 | A1 * | 4/2011 | Liu | H04L 43/12 370/252 |
| 2011/0255538 | A1 * | 10/2011 | Srinivasan | H04L 41/0893 370/392 |
| 2012/0131222 | A1 * | 5/2012 | Curtis | H04L 47/2441 709/235 |
| 2014/0237118 | A1 * | 8/2014 | Matthews | H04L 47/2441 709/226 |

\* cited by examiner

*Primary Examiner* — Jason Mattis
(74) *Attorney, Agent, or Firm* — David R. Stevens; Stephen Preston; Stevens Law Group

(57) ABSTRACT

Systems and methods are disclosed for classifying traffic flows. A traffic agent operable to collect classification information for one or more traffic flows may be deployed at an end host communicatively coupled to a data-center network. The traffic agent, deployed in a user space independent of the operating system, may compare the classification information for a given traffic flow to a metric value. Where the classification information achieves a certain threshold indicated by the metric value, the traffic agent may classify the traffic flow as an elephant flow. In some examples, a library may be included with the traffic agent that may include a modified send function. The modified send function may provide classification information to the traffic agent indexed to the traffic flow for which it is called so that the traffic agent may analyze the classification information to potentially provide a classification for the traffic flow.

17 Claims, 7 Drawing Sheets

TRAFFIC FLOW CLASSIFICATION

RELATED APPLICATIONS

This application claims the benefit of and hereby incorporates by reference U.S. Provisional Application Ser. No. 61/876,045, filed on Sep. 10, 2013.

FIELD OF THE INVENTION

This invention relates to networking and more particularly to the classification of traffic flows in data-center networks.

BACKGROUND OF THE INVENTION

Traffic across a data-center network may be characterized in terms of traffic flows. A traffic flow may be thought of as a series of interrelated frames, or packets, sent from a common source computer in the data-center network to a common destination in the data-center network. Traffic flows may come in many different sizes. Typically, most traffic flows are short in duration and/or bursty. Such short traffic flows are often referred to, because of the relatively small times and/or amounts of information being transferred by these traffic flows, as "mice flows" Other traffic flows, however, may transfer larger amounts of information, potentially over longer periods of time. On account of the relatively large amounts of time involved and/or the relatively large amounts of information being transferred during these relatively large traffic flows, these large traffic flows are often referred to as "elephant flows."

The presence of these differing types of traffic flows in a common data-center network may have implications for the performance of the data-center network. Although elephant flows are typically more rare than mice flows, typically, the majority of the packets being transferred in a data-center network pertain to elephant flows. The presence of such elephant flows across a substantially fixed path in the data-center network for a relatively long amount of time, may, for example, cause congestion in the data-center network.

BRIEF DESCRIPTION OF THE DRAWINGS

In order that the advantages of the invention will be readily understood, a more particular description of the invention will be rendered by reference to specific embodiments illustrated in the appended drawings. Understanding that these drawings depict only typical embodiments of the invention and are not, therefore, to be considered limiting of its scope, the invention will be described and explained with additional specificity and detail through use of the accompanying drawings, in which.

DETAILED DESCRIPTION

It will be readily understood that the components of the present invention, as generally described and illustrated in the Figures herein, can be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
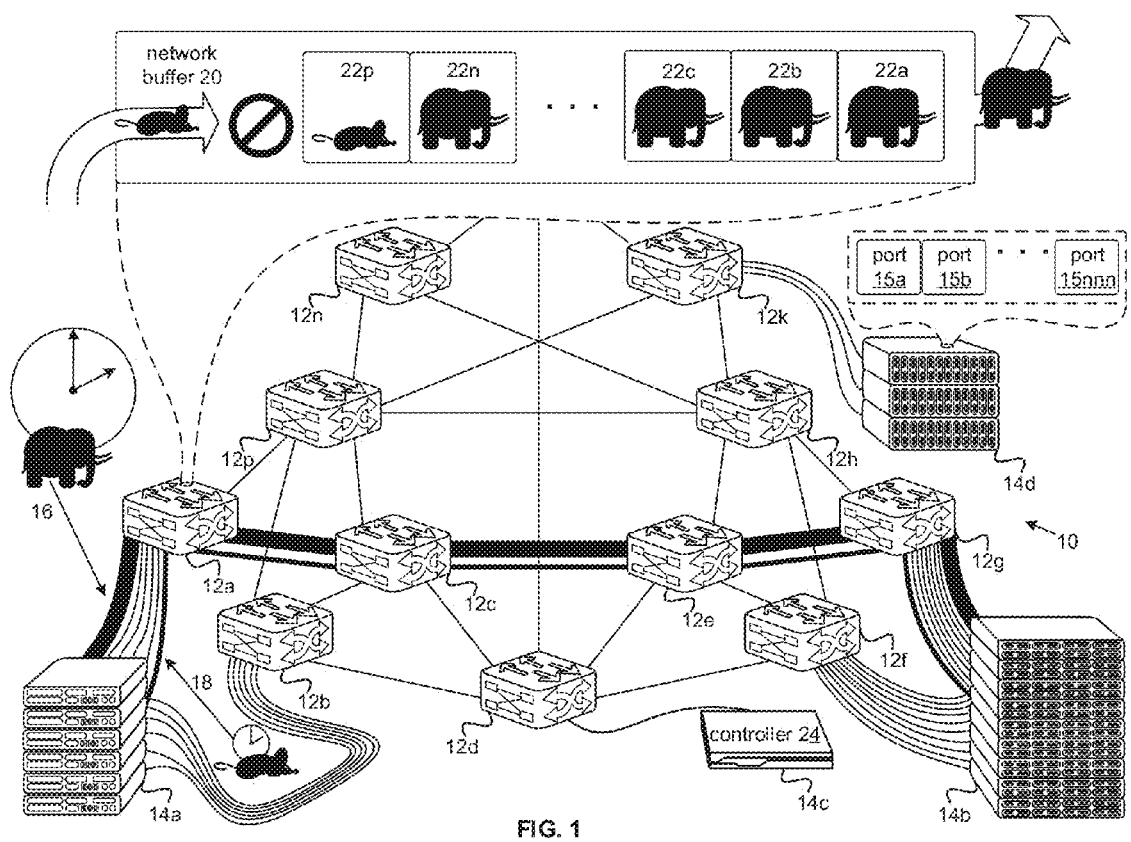
FIG. 1 is a schematic block diagram of a data-center network together with an elephant flow and a mouse flow, illustrative of potential difficulties and other implications.

Referring to FIG. 1, a portion of a data-center network 10 is depicted. The data-center network 10 may be deployed with one or more switches, routers, hubs and/or the like 12*a*-*p*. These network devices 12*a*-*p* may be communicatively connected to one another by one or more uni- or bi-directional links, as depicted in FIG. 1. As can be appreciated, the topography depicted in FIG. 1 is not limiting. The data-center network 10 and/or the network devices 12 therein, may facilitate, without limitation, east-west traffic flows. For example, as discussed below, the data-center network 10 and/or the network devices 12 may facilitate east-west traffic flows in the sense of flows between servers in the data center 10. However, north-south flows, such as, without limitation, flows between one or more clients and one or more servers and/or other hierarchical flows may be possible.

A network host 14, also referred to as an end host 14, may be connected to the data-center network 10 via one or more uni- or bi-directional links. Furthermore, a network host 14 may be any form of computing device connected to the data-center network 10 capable of providing data, receiving data, storing data, and/or processing data for and/or from a user and/or other node in the data-center network 10. Without limitation and for purposes of illustration only, a server may provide an example of a network host 14. Another non-limiting example may include a set of Solid State Drives (SSDs).

Processes common in data-center networks 10, such as cloning, backup, virtual machine migration, and the shuffle phase of a Hadoop implementation, to name a few non-limiting examples, may generate a large traffic flow, such as an elephant flow 16. The portion of the data-center network 10 depicted in FIG. 1 is depicted with an elephant flow 16. The elephant flow 16 is denoted with an elephant symbol and the series of thick bold lines describing a path through the data-center network 10 for the elephant flow 16 from a network host 14 in the first set of network hosts 14*a* through a first switch 12*a*, a second switch 12*c*, a third switch 12*e*, and a fourth switch 12*g* to another host 14 in another set of end hosts 14*d* in the data-center network 10.

Within the data-center network 10 a physical end host 14, such as the top-most end host 14 of the fourth set of end hosts 14*d*, may serve as a source and/or a destination for one or more traffic flows with a source Internet Protocol (IP) address and/or destination IP address. In such examples, the end host may support multiple ports 15*a*-15*nn*. A port may be a communication endpoint that may serve to provide a software construct specific to an application and/or process to allow the specific application and/or process to facilitate the sharing of a physical connection for the host 14 to a packet-switched, data-center network 10. Furthermore, a port 15 may facilitate one or more transmission layer protocols, such as, without limitation, Transmission Control Protocol (TCP).

An individual port may have a unique identification number, such as, without limitation, a sixteen-bit, port identification number. A unique traffic flow may be defined by a unique combination, such as, without limitation, a unique tuple, such as without limitation: <source IP, destination IP, source Port, destination port>, representing a single connection between source and destination. As can be appreciated, there may be multiple traffic flows between the same source and destination where the multiple traffic flows may be, at least in part, differentiated by one or more port numbers involved. In some embodiments, a traffic flow may also be defined by a corresponding transport-layer protocol used in the connection for the traffic flow. A traffic flow within a physical node, such as, without limitation, an end host 40, can be defined by a unique tuple, such as, without limitation, a tuple of the form discussed above.

A large flow 16, or an elephant flow 16, may be defined in many different ways. For example, such flows 16 may be defined in terms of an interval of time over which a traffic flow persists. They may be defined in terms of a data rate for a traffic flow derived by an amount of data transferred in a given time interval. An additional non-limiting example may include an aggregate size of data transferred during the flow. A further non-limiting example may include a known process for large flows 16 to which a given traffic flow 16 belongs.

Values for one or more of these metrics may vary according to the data-center network 10. Indeed values may be changed dynamically, according to network needs. However, one non-limiting way to begin to think about determining such values, provided by way of example and not limitation, may include determining a value for one or more metrics such as data transmitted, transmission rate, and/or flow duration, below which a certain percentage of traffic flows, say, for example 80% or 90% can be characterized. In such examples, an elephant flow 16 may be considered to be any traffic flow above this value.

Additionally, or in the alternative, in some examples, a value may be arrived at by looking at a certain percentage of packets, or data, that are transmitted in the data-center network 10 for one or more values for one or more metrics. Since elephant flows 16, although more rare than mice flows 18, often transmit the majority of packets, one or more values may be determined where the predetermined percentage of packets, or data, is transferred by traffic flows with values at or above those selected. By way of another non-limiting example, one or more values may be selected and/or fine-tuned in relation to effects on network performance.

Non-limiting examples of values for exemplary metrics within a non-limiting example of a data-center network 10 may include 1 MB of data, with respect to size, 5 MBps, with respect to a rate, and/or 100 micro seconds, with respect to duration. As can be appreciated, however, any number of different values may be selected for a wide variety of metrics, based on different types of data-center networks 10, and/or demands placed on such data-center networks 10. Indeed, in some examples, different categories of large/elephant flows 16 may be defined, such as, by way of example and not limitation, baby elephant flows, regular elephant flows, and/or extra-large elephant flows.

Also depicted in FIG. 1 is a mouse flow 18. The mouse flow 18, indicated by the mouse symbol, describes a path through the data-center network 10, indicated by the series of slightly emboldened connections from a network host 14 within the first set of network hosts 14*a*, to a first network device 12*a*, to a second network device 12*c*, to a third network device 12*e*, to another edge device 12*g*, and then to another network host 14 in a second set of network hosts 14*b*. A mouse flow 18 may also be defined in many different ways. For example, a mouse flow 18 may be any flow that is not an elephant flow 16. However, in other examples, in which more than two types of traffic flows are possible, a mouse flow 18 may be specifically defined. Such definitions may be arrived at by evaluating considerations discussed above with respect to elephant flows 16 from an inverse perspective. Additional considerations may also play a role.

As can be appreciated, both the elephant flow 16 and the mouse flow 18 not only enter the data-center network 10 through the same network device 12*a*, but they are directed from the common network device 12*a* to a common second network device 12*c*. This confluence of the elephant flow 16 and the mouse flow 18 may be problematic for a number of reasons. To aid in the discussion of potential problems, a network buffer/queue 20 at the common-entry, edge device 12*a* at which the confluence occurs is depicted in the expanded view provided for FIG. 1.

A network buffer/queue 20 may be an inbound network switch buffer/queue, an outbound network switch buffer/queue, or a logical combination of the two. Similarly, analogous network buffers 20 may be described with respect to routers and/or other types of network devices 12. Different buffers 20 may correspond to multiple different paths through a network device 12. A network buffer 20 may be implemented as a First In First Out queue and or shared memory for storing frames 22*a-p*, in examples involving switches, packets 22*a-p*, in examples involving routers, and/or the like.

As indicated by the large clock symbol of the elephant flow 16 relative to the size of the clock symbol associated with the mouse flow 18, the duration of the elephant flow 16 may be relatively large. Because of the a large duration of the elephant flow 16, which may have been initiated prior to the mouse flow 18, one or more buffers 20 relevant to the confluence of the elephant flow 16 and the mouse flow 18 may fill up with several elephant frames/packets 22a-n. A subsequent mouse frame/packet 22p may, therefore, need to wait for one or more of these elephant frames/packets 22a-n before being transmitted.

Unfortunately, not only may such waits arising from the presence of an elephant flow 16 slow down one or more mouse flows 18, but mice flows 18 may typically be associated with processes that may be sensitive to latency. The higher sensitivities to latency associated with mice flows 18, therefore, may result in additional negative implications. Further, the greater prevalence of mice flows 18, which may account for, without limitation, 90% of traffic flows in the data-center network 10, may mean that many mice flows 18 may be negatively impacted by a single elephant flow 16. Because, despite their relative scarcity, elephant flows 16 may account for as much as 90% of the data transmission in a data-center network 10, the periods of time during which an elephant flow 16 may congest one or more network paths may often be significant.

Furthermore, in scenarios where an elephant flow 16 contributes to the filling up of a network buffer 20, data from one or more additional mouse flows 18 and/or elephant flows 16 may not be transmitted and/or stored in the relevant network buffer 20, as indicated by the circle symbol with a bar through it. As a result, either a frame/packet 22 currently in the buffer's memory will need to be dropped, or the incoming frame/packet will be dropped. Of course, either scenario is undesirable.

Additionally, approaches to traffic engineering commonly applied in data centers, such as Equal-Cost Multi-Path (ECMP), while well suited to large numbers of mice flows 18 without elephant flows 16, may not be well suited to optimize performance in data-center networks 10 with one or more elephant flows 16. Such mice-flow approaches may do little to orchestrate specific paths for individual mice flows 18. The short durations of mice flows 18 may not lend themselves to orchestrating such individualized paths.

The longer durations of elephant flows 16, however, may provide many opportunities to improve the performance of data-center networks 10 in which they may occur through orchestrating specific paths for one or more of such elephant flows 16 and/or other traffic flows in relation to the elephant flow(s) 16. However, achieving such performance gains and/or mitigating the problems discussed above may first require the identification of an elephant flow 16. The following figure discusses various previous approaches to identifying, detecting, and or classifying large flows 16 and/or elephant flows 16 together with discussions revealing shortcomings of such approaches.

Figure 2:
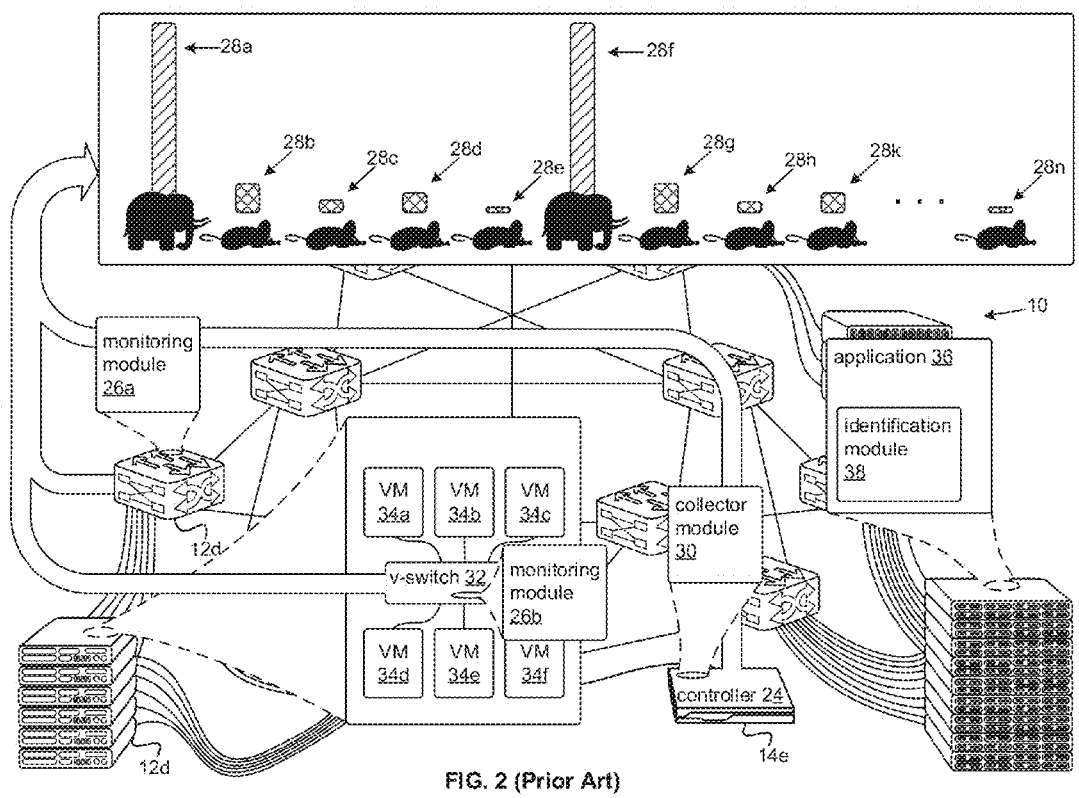
FIG. 2 is a schematic block diagram of previous approaches to detect and/or classify the presence of an elephant flow in a data-center network in accordance with prior art.

Referring to FIG. 2, portions of a data-center network 10 are depicted, together with approaches to the detection, identification, and/or classification of elephant flows 16. The portion of the data-center network 10 may include network devices 12a-p, such as switches, routers, hubs, and the like, together with one or more sets of network hosts 14a-d. In some examples, such as examples where the network is configured to operate with open flow, the network may include a controller 24 operable to dynamically alter tables and/or flow paths in the data-center network 10. The controller 24 may be utilized to optimize performance by dynamically altering tables at network devices 12 to configure flow paths in ways that may reduce congestion that may arise from the presence of one or more elephant flows 16 once one or more elephant flows 16 are detected.

To detect large flows 16, previous approaches, such as HEDERA and HELIOS, have included something like a monitoring module 26a-b. A monitoring module 26a-b may be configured to maintain statistics 28a-n for individual traffic flows. Such statistics 28a-n may measure sizes, rates, and/or the like for individual traffic flows. Periodic polling of these statistics 28a-n may be performed by a controller 24, either by requesting or receiving the statistics from one or more network devices 12 in such scenarios. The controller 24, may learn, therefore, of traffic flows with large values with respect to one or more relevant metrics. For example, the large values for the first and the sixth statistical units 28a, 28f in FIG. 2 are indicative of elephant flows 16.

Such approaches, however, may require significant amounts of overhead at individual switches and/or network devices 12 to track individual traffic flows. Such overhead may include individual flow-table entries for each traffic flow being monitored. Considering that a network device 12 in a data-center network 10 with a thousand or so network hosts 14 may see tens of thousands of flow arrivals per second, the overhead requirements can be significant. As the size of the data-center network 10 increases, the size of the overhead required may grow exponentially, preventing such approaches from being scalable. Furthermore, the limited bandwidth available on links between network elements 12 and/or network elements 12 and the controller 24 may create a traffic-management bottleneck.

Sampling approaches provide an alternative that may be more scalable. According to such approaches, a collector module 30 at the controller 24 may obtain information from sample frames/packets 22 from the various ports at a switch or other network device 12. Some of such approaches rely on sampling features such as sFlow to collect this polling information, which may include header information for the sampled frames/packets 22. By sampling frames/packets 22, as opposed to tracking individual traffic flows, sampling approaches may be able to reduce overhead.

However, the rates at which sampling is performed, such as one in a thousand packets per frame, to keep overhead down and reduce data transfers to the collector module 30 and/or controller 24 reduce the accuracy with which an elephant flow 16 may be detected. What is more, sampling the frames/packets 22 at such rates means that large numbers of frames/packets 22 must be transmitted for a sufficiently large fraction of those frames/packets 22 to allow a an elephant flow 16 to be detected in the sample information provided to the collector 30. For example, in scenarios consistent with a sampling rate of one in a thousand, an elephant flow 16 may need to transmit ten-thousand frames/packets 22, or about fifteen megabytes of data before the elephant flow may be reliably detected. Therefore, some elephants may not be detected and where they are detected, they may have already congested the network for a significant period of time. Furthermore, such sampling approaches require significant overhead at the controller 24.

In scenarios where one or more end hosts 14 support virtualization and a v-switch 32 for multiple Virtual Machines (VMs) 34, statistics 28a-n may be collected at the v-switch 32. Indeed, open v-switch already supports per-flow granularity. However, this v-switch 32 approach is only applicable where v-switches 32 are supported. Such an approach cannot be applied ubiquitously across a data-center network 10 that may include network hosts 14 that do not support v-switchs 32, a possibility that increases with the size of the data-center network 10. Furthermore, v-switchs 32 are typically implemented in hypervisors. Therefore, reliance on v-switches 32, may impose the lack of flexibility, delays, additional overhead, and reduced numbers of VMs 34 typically associated with hypervisors on the data-center network 10. Perhaps, software switches could be developed to sit outside of a hypervisor, but such solutions would themselves require significant overhead for their implementation.

Furthermore, the proceeding approaches all rely on detection at the data-center network 10, which is inherently removed from the hosts 14 where traffic flows originate. If a system waits until a traffic flow is already introduced into the data-center network 10 before classifying the traffic flow as an elephant flow 16, the elephant flow 16 will already impact the data-center network 10 before the detection process can even begin. To address this inherent latency with network based approaches, some approaches rely solely on applications 36 running at the network hosts 14 and/or the VMs 34 to classify traffic flows.

In such examples, an application 36 may be provided with something like an identification module 38. Since applications 36 are responsible for generating traffic flows, applications are in a good position to have knowledge about the size, duration, rate, and such characteristics of the flows. Therefore, applications 36 may be configured to determine whether a frame/packet 22 belongs to a large/elephant flow 16 based on predetermined criteria. The identification module 38 may identify frames/packets 22 that meet the criteria and tag them with an identifier, for example, with a set of bits in a header space.

Although such approaches address the classification problem with little demand upon a data-center network 10, they can present many logistical challenges. For example, individual applications 36 must be tailored to provide handle such classification. Furthermore, the criteria for large/elephant flows 16 may vary from data-center network 10 to data-center network 10 and/or within a single data-center network 10 over time. Establishing and/or updating such criteria across a data-center network 10 is a non-trivial matter. This is particularly true in data centers, making such approaches unpractical.

As can be appreciated, previous approaches to the detection, identification, and/or classification of large/elephant flows 16, present significant drawbacks that make their application problematic and/or impractical for many data-center networks 10. Such drawbacks include overhead in the data-center network 10, inflexibility, latency in classification, reliability issues, and logistical challenges, among others. Therefore, novel approaches for addressing these issues are required. A brief overview of some of such innovations is provided below.

In some examples, a traffic agent may be operable to be deployed at an end host 14 communicatively coupled to a data-center network 10, removing the need for overhead at switches and/or network devices 12, overhead that would be greater at the switches 12 due to the number of network hosts 14 and/or nodes 12 to which they connect. The traffic agent may be further operable to be deployed within a user space, independent of a kernel space of an operating system running on the end host 14. The user space may also store one or more additional applications. Such a traffic agent may be operable to monitor traffic flows originating at the end host 14.

To assist in the monitoring of traffic flows, a collection module may be provided within the traffic agent. The collection module may be operable to collect packet/classification information for one or more traffic flows originating at the end host 14. Furthermore, a classification module may be provided within the traffic agent. The classification module may be operable to classify an individual traffic flow, from the one or more traffic flows, as an elephant flow 16 where one or more values of the classification/packet information for the individual traffic flow exceeds a corresponding threshold value for a flow metric.

In some examples, a library may be added within the traffic agent. A send function may be provided with the library. The send function may be operable to send one or more frames/packets pertaining to the individual traffic flow from a socket at the end host 14. In such examples, the collection module may include the portion of the send function operable to copy classification/packet information from a call to the send function for classification analysis by the classification module.

Certain examples may include a traffic agent. The traffic agent may further be operable to be deployed within a user space independent of a kernel space of an operating system on an end host. The traffic agent may be operable to monitor multiple computing instances 34 supported by the end host 14. In such examples, the collection module may further be operable to collect classification/packet information for individual traffic flows from the multiple virtual computing instances 34, which may be VMs 34. Additionally, the classification module may further be operable to compare the classification/packet information collected for the traffic flows from the multiple virtual computing instances 34 to the threshold value for the flow metric. By means of the comparisons, the classification module may make individual determinations with respect to individual traffic flows to classify a subset of the individual traffic flows as one or more elephant flows 16.

As can be appreciated, many of the functionalities discussed with respect to previous approaches to elephant-flow classification and with respect to many of the new functionalities discussed with respect to the novel and innovative approaches disclosed herein are described as taking place at modules. Throughout this application, the functionalities discussed herein may be handled by one or more subsets of modules. With respect to the modules discussed herein, aspects of the present innovations may take the form of an entirely hardware embodiment, an entirely software embodiment (including firmware, resident software, micro-code, etc.), or an embodiment combining software and hardware aspects that may all generally be referred to herein as a "module." Furthermore, aspects of the presently discussed subject matter may take the form of a computer program product embodied in any tangible medium of expression having computer-usable program code embodied in the medium.

With respect to software aspects, any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that may contain, store, communicate, propagate, or transport the program for use by or in connection with the instruction execution system, apparatus, or device.

Computer program code for carrying out operations of the present invention may be written in any combination of one or more programming languages, including an object-oriented programming language such as C++, or the like, and conventional procedural programming languages, such as the "C" programming language, or similar programming languages. Aspects of a module, and possibly all of the module, that are implemented with software may be executed on a micro-processor, Central Processing Unit (CPU) and/or the like. Any hardware aspects of the module may be implemented to interact with software aspects of a module.

Figure 3:
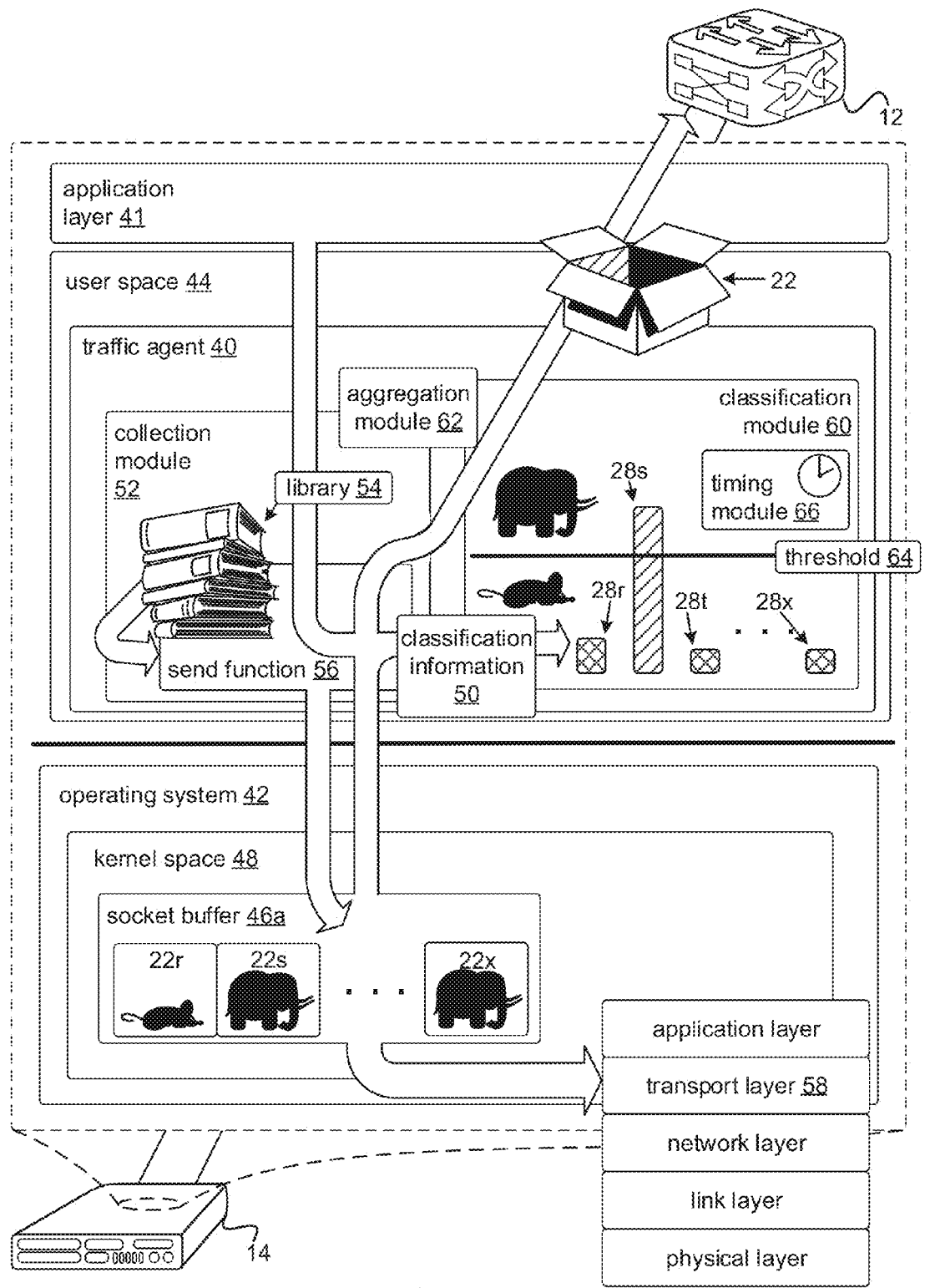
FIG. 3 is a schematic block diagram of a traffic agent residing at an end host within the user space of the end host, the traffic agent operable to collect classification information and to detect, identify, and/or classify a large/elephant flow, in accordance with examples.

Referring to FIG. 3, a system for classifying traffic flows at an end host 14 is depicted. A traffic agent 40, which may be implemented as a module, is depicted. The traffic agent 40 may be operable to be deployed at the end host 14 and may be operable to classify traffic flows. The end host 14 may be communicatively connected to a data-center network 10, as depicted in FIG. 3 by the communication links between the end host 14 and the switch 12.

Placing the traffic agent 40 at the end host 14 to perform classification operations at the end host 14 may remove the need for overhead within the data-center network 10, such as at high-density switching Application-Specific Integrated Circuits (ASICs), where elephant flows 16 have, traditionally, been detected. Network elements 12 lend themselves to detection operations, because this is where such elephant flows 16 are actually handled and directed along their flow paths. Furthermore, a single network element 12 may be configured to perform such detection without any assumptions about the network/end hosts 14 where the elephant flows 16 are generated. However, as data-center networks 10 become larger and larger, the required overhead becomes more and more significant and even limiting.

As discussed above, previous approaches to remove the load of classification operations from the data-center network 10 have relied upon the applications 36 residing at end hosts 14 themselves to classify the frames/packets that they generate. However, relying on applications 36 requires insuring that applications 36 will provide this functionality, a logistical impossibility for many scenarios. One possible solution may be to provide an application-independent traffic agent 40, as proposed above at individual end hosts 14.

Regardless of the independence of such a traffic agent 40 from applications 36, placement of the detection operations at end hosts 14 may involve configuring all, substantially all, or a significant number of such hosts 14 to perform classification operations. Such levels of participation by end hosts 14 may be logistically involved. As coordination among end hosts 14 increases generally, however, certain levels of participation for end hosts 14 in configurations for such coordinated activities may already be present and would be less complicated than enabling multiple applications 36 at multiple hosts 14 to perform these functions.

Various approaches to traffic engineering provide non-limiting examples of such coordination. Approaches to providing classes with different levels of priority for traffic provide additional examples. Also, end hosts 14 in a data-center network 10 making use of a Hadoop approach may be configured to support task trackers and/or data nodes consistent with a Hadoop framework. In some examples, software may be provided to these end hosts 14 operable to support such aspects of the Hadoop framework. Therefore, a sufficiently light weight traffic agent 40 may be provided with such software to be deployed to provide coordinated capabilities at a cluster of network hosts 14 in a data-center network 10. In other examples, the traffic agent 40 may be deployed independently.

An end host 14 on which a traffic agent 40 may be deployed may also have an operating system 42 deployed thereon. Such a traffic agent 40 may be operable to reside within user space 44. Deploying the traffic agent 40 within the user space 44 may be counterintuitive.

As discussed in more detail below, one or more socket buffers 46, from which information about traffic flows may be gleaned, may typically reside within a kernel space 48 for an operating system 42. Combining the traffic agent 40 with an operating system 42 deployed on network hosts 14 to support the functionalities of those network hosts 14 may remove logistical concerns about the installation of the traffic agent 40 across network hosts 14 in the data-center network 10. However, as discussed in greater detail below, approaches that rely on the operating system 42 may reduce overall flexibility.

The traffic agent 40 may be operable to monitor one of more traffic flows generated at the end host 14 indefinitely and/or for a period of time. Furthermore, the traffic agent 40 may be operable to compile classification information 50 for a traffic flow and/or compare the classification information 50 for the traffic flow to one or more values for one or more metrics. Where the classification information 50 achieves a predetermined level relative to the one or more values for the one or more metrics for the given traffic flow, the traffic agent 40 may classify the given traffic flow as an elephant flow 16.

By placing the traffic agent 40 to handle the classification of traffic flows within user space 44, some examples may take advantage of the proximity to the application layer 41. In such examples, the traffic agent 40 and/or an application interference module may access information relevant to the classification of a traffic flow that is not available in the kernel space 48. The traffic module 40 may access such information via a collection module 52. The application information module, which is discussed in more detail below with respect to FIG. 5, may reside apart from or within the traffic agent 40 and/or the collection module 52. For purposes of providing non-limiting examples, such information may include information identifying a job to which a traffic flow pertains and/or information identifying a particular application that triggers the traffic flow. The traffic agent 40 may include the information it obtains in this way with the classification information 50.

The traffic agent 40, possibly via the classification module 60, may utilize aspects of the classification information 50 obtained from the traffic agent's 40 proximity to the application layer 41 in the classification of the traffic flow to which the classification information pertains. For example, the classification module 60 may, without limitation, base a classification entirely on such information, may use such information to improve the reliability of a classification, and/or may use the information to provide a classification with a finer degree of granularity within the overarching category of an elephant flow 16.

As discussed above, there may be multiple different kinds of elephant flows 16 and information derived from a close proximity to the application layer 41 may be used to differentiate among these different types of elephant flows 16, allowing different types of elephant flows 16 to be treated differently. Such examples can be distinguished from previous approaches relying on applications 36 to handle classification by the ability of the traffic agent 40 and/or the collection module 52 and/or the classification module 60 to perform analysis, derive classifications, handle updates, interact and adapt to different applications 36 and/or more.

By way of example and not limitation, such classification/packet information 50 may include values provided for parameters of the send function 56. Not by way of limitation, with respect to identifying individual traffic flows, classification/packet information 50 may include a socket name, an associated socket, one or more Internet Protocol (IP)

addresses, one or more port numbers, an end-to-end protocol, a domain name, a pointer to a buffer containing data to be transferred and/or the like. Also, by way of example and not limitation, with respect to classifying an individual traffic flow, classification/packet information 50 may include a length of bytes to be transferred.

In some examples, the traffic agent 40 may be provided with a collection module 52 operable to collect classification/packet information 50 for one or more traffic flows. In some, but not necessarily all examples, the collection module 52 may accomplish the collection of classification/packet information 50 by means of a library 54 with an altered/modified send function 56. When a call is made to the send function 56 indicating a given socket buffer 46, the classification/packet information 50 may be coordinated to a traffic flow, at least in part, by the classification/packet information 50 discussed above.

More particularly, in some examples where the traffic agent 40 includes such a library 54, the library 54 may make up a socket Application Programming Interface (API), or portion thereof, operable to interface with a socket buffer 46a, which may reside within the kernel space 48 of the operating system 42. The socket buffer 46a may pertain to a TCP connection at a network layer 58. Additionally, such a socket buffer 46 may pertain to a particular port for the network host 14 and/or a given VM 34. Such a socket buffer 46 may be operable to buffer multiple packets 22r-x for one or more traffic flows, which may be either elephant flows 16 and/or mice flows 18, until such packets 22, depicted as the package box in FIG. 3, are sent to the data-center network 10 as part of a given flow.

As stated, such a library 54 may be provided with a modified, or altered, send function 56. The modified, or altered, send function 50 may be modified to include a portion of code operable to copy classification information 50 from a call of the send function 56. By copying the classification information 50, the send function 56 may enable the given traffic flow to be compiled by the traffic agent 40 as part of the monitoring of the given traffic flow, as performed by the traffic agent 40. The overhead involved with such a library 54 and/or in such modifications to a send function 56 would be, as can be appreciated, de minimus.

In examples where the collection module 52 is not provided with a library 54 with a modified send function 56, as discussed above, the collection module 52 may further comprise a socket intercept module. The socket interface module may be operable to intercept function calls pertaining to a pre-existing socket API. By intercepting these function calls, the socket intercept module may be operable to allow the collection module to copy classification information relevant to a given traffic flow.

In some examples, the classification information 50, copied and collected from a call to the send function 56 may be sufficient for a classification module 60, which may be provided with the traffic agent 40 to analyze and classify a traffic flow. However, in certain examples, the traffic agent 40 may include an aggregation module 62 within the traffic agent 40. The aggregation module 62 may be operable to aggregate multiple sets of classification/packet information 50 for a common traffic flow for analysis by a classification module 60. Again, the classification/packet information 50 may be coordinated to a traffic flow, at least in part, by the information in the classification/packet information 50 itself. The aggregation module 62 may provide multiple sets of flow statistics 28r-x to the classification module 60. The classification module 60 may compare the flow statistics 28r-x to one or more threshold values 64 for one or more metrics. Where the classification module 60 determines that the flow statistics 24 for an individual traffic flow achieve, or cross, the one or more threshold values 64, the classification module 60 may classify the traffic flow as an elephant/large flow 16.

Some examples may involve a timing module 66 may within the traffic agent 40. The timing module 66 may be communicatively connected to the collection module 52 and/or the classification module 60. Such a timing module 66 may be operable to track a timing interval over which classification/packet information 50 may be collected by the collection module 52 for a given traffic flow and/or considered by the classification module 60 for a particular instance of a classification determination.

As more and more data-center networks 10 are built around and/or include virtualized computing environments, the implications of such computing environments become relevant to assessing an approach to classification. Several implications may be discovered for the application of the innovative approaches discussed above in a virtualized computing environment. An exploration of these implications is provided below in the following figures.

Figure 4:
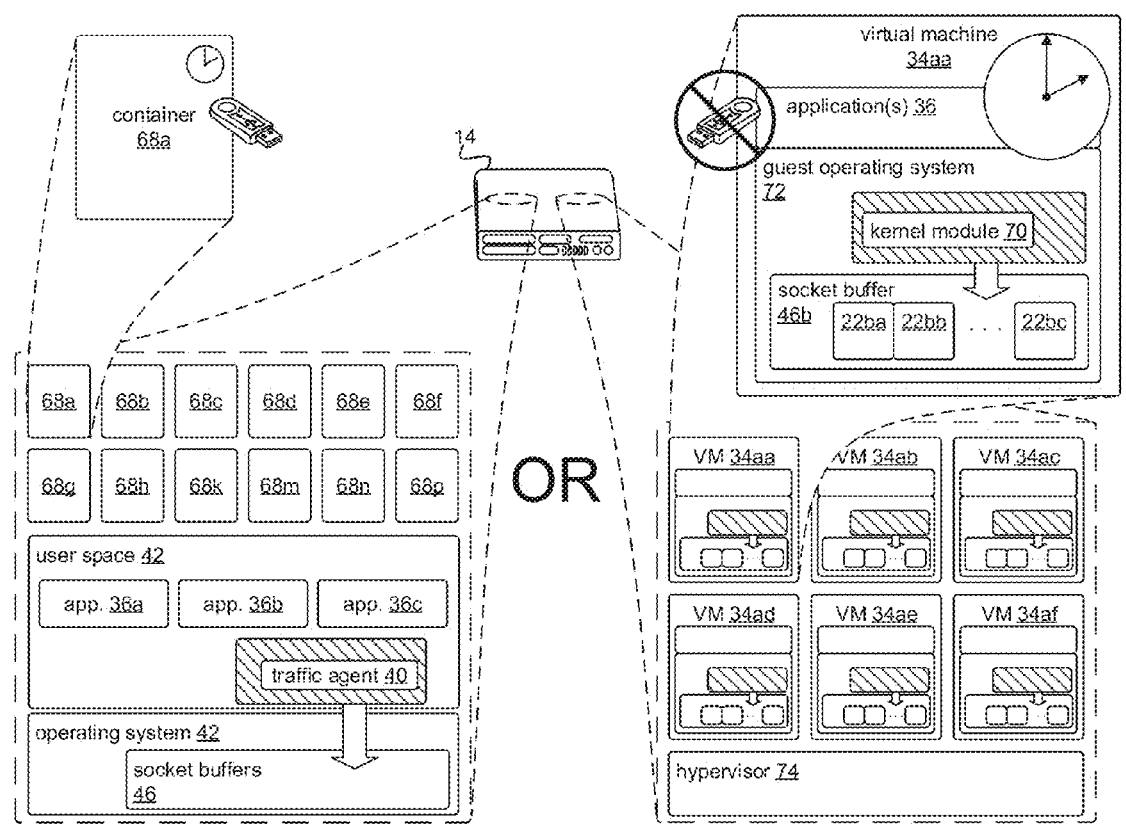
FIG. 4 is a schematic block diagram of a traffic agent residing within the user space of an end host as compared to a kernel module operable to perform functionalities similar to those of the traffic agent, but residing within an operating system, the comparison made in terms of a virtual environment supporting multiple virtual computing instances and illustrative of the advantages of a traffic agent residing within the user space, independent from the kernel space of the operating system of the end host, in accordance with examples.

Referring to FIG. 4, a traffic agent 40 is depicted residing in a user space 44 at an end host 14 that supports a virtual computing environment with multiple virtualized computing instances 68a-p. The traffic agent 40 is contrasted with a kernel module 70 within an operating system 42 that is also at an end host 14 that also supports virtual machines 34. The kernel module 70 may be operable to perform detection, identification, and/or classification functionalities similar to those of the traffic agent 40, but from within an operating system 42/72.

More intuitive approaches may place classification operations within the operating system 42, closer to the socket buffers 46 where classification/packet information 50 may be obtained. However, a comparison with such operating-system based approaches in a virtualized computing environment highlights implications for finding ways to handle classification operations within the user space 44. For example, by placing the classification operations in the operating system 42/72 in a kernel module 70, such as in a shim, the classification of traffic flows for individual VMs 34, rely on VM-specific operating systems 72 for those individual VMs 34. These operating systems 72 are often referred to as guest operating systems 72 because of their presence on an underlying host 14. One or more application(s) 36 may run above such operating systems 42/72.

A hypervisor 74 provides individual guest operating systems 72 with a virtual operating platform and oversees the execution of the guest operating systems 72. Therefore, approaches involving guest operating systems 72 entail the presence of a hypervisor 74, whether a type-one hypervisor 74 running directly on the hardware of an end host 14, or a type-two hypervisor 74 running on a host operating system 42. Although hypervisors 74 may be useful in deploying operating systems 72 of differing types, such as LINUX and WINDOWS, hypervisors 74 have significant costs. In scenarios involving a kernel module 70 within the operating system 42/72, the kernel module 70 may rely on the hypervisor 74 to carry out its functionality.

Owing to this reliance on the hypervisor 74, the kernel module 70 requires a hypervisor 74 and may even require a particular type of hypervisor 74, imposing limitations for the integration of different types of systems within a data-center network 10 configured to perform such classification and the scalability of such approaches. By placing the traffic agent 40 in the user space 44, the traffic agent 40 may sit in close proximity to the application layer 41. In such examples, a library 54 may sit transparently under applications to inspect traffic flows of those applications.

In other words, the traffic agent 40 may be hypervisor-agnostic. A traffic agent 40 that is hypervisor-agnostic may work in several different systems, which may be integrated to achieve scale. Indeed, a virtualization environment, such as an Operating-System (OS)-virtualization environment, without a hypervisor 74, may be employed.

In an OS-virtualization environment, once the operating system 42 has been booted, an operating-system-virtualization environment may support elastic resource allocation. In other words, resources, such as virtualized computing instances 68, may be supported, which may be added on the fly without having to shut down the host 14 and/or engage in volume resizing. Conversely, an approach employing a hypervisor 74 may require a shutdown of a VM 34 to allow a guest operating system 72 to handle new resources, such as, without limitation, through disk volume resizing and/or repartitioning.

By placing the traffic agent 40 in the user space 44 additional advantages may be obtained. For example, less CPU and memory resources may be relied upon. Such efficiencies may be achieved, at least in part, by inspections of traffic flows near the application layer 41.

Since the traffic agent 40 is within a user space 44, the traffic agent 40 may be made operable to interface with a range of socket types provided by a range of different operating systems 42. In this way, the approach may become highly portable, as indicated by the flash-drive icon in the expanded view of the first virtualized computing instance 68a. By way of providing some examples, and not limitation, a virtualized computing instance 68 may be a VM 34, or an isolated container 68.

Figure 5:
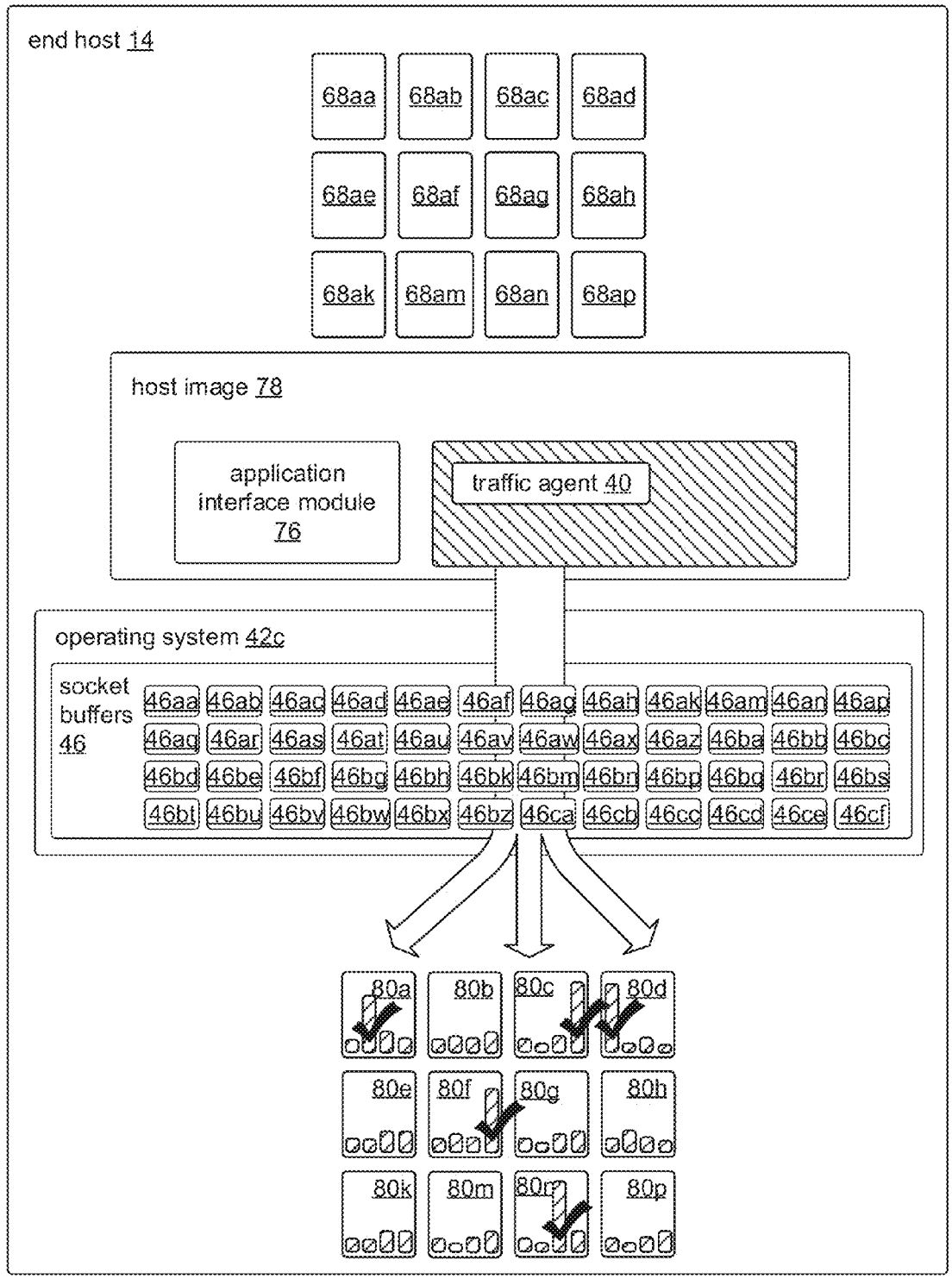
FIG. 5 is a schematic block diagram of an application interface module together with a traffic agent deployed on an end host and operable to collect classification information for multiple virtual computing instances supported by the end host and identify large/elephant flows, in accordance with examples.

Referring to FIG. 5, an application interface module 76 is depicted together with a traffic agent 40 deployed on an end host 14. Although the application interface module 76 is depicted alongside the traffic agent, the application interface module 76 may reside within the traffic agent. The operating system 42c of the end host 14 may support multiple virtualized computing instances 68aa-ap. The traffic agent 40 may be further operable to monitor a plurality of traffic flows from the multiple virtualized computing instances 68aa-ap. In such examples, the traffic agent 40 may monitor multiple socket buffers 46aa-cf associated with the plurality of traffic flows from the computing instances 68aa-ap.

The traffic agent 40 may correlate the statistical units 28 for the various traffic flows generated by the virtualized computing instances 68aa-ap into traffic-flow-source sets 80a-p. The traffic flows may have corresponding statistical units 28 that qualify as large flows 16 and/or elephant flows 16, indicated by the check marks. Because of the correlation between traffic-flow-source sets 80a-p and virtualized computing instances 68aa-ap, such elephant and/or large flows 16 may be indexed to the virtualized computing instances 68aa-ap from which they originate.

To further take advantage of the placement of the traffic agent 40 at the end host 14, the traffic agent 40 may be configured to coordinate with approaches where one or more applications 36 engage in classification operations. In some examples, the traffic agent 40 may work in concert with an application interface module 76. In such examples, the application interface module 76 may reside within the traffic agent 40 and/or be in communication with the traffic agent 40. The application interface module 76 may be operable to perform one or more of several operations. For example, the application interface module 76 may be operable to extract classification/packet information 50 for a subject traffic flow from a request made to the end host 14 and/or a virtual computing instance 68 running on the end host 14 to generate the subject traffic flow.

Alternatively, or additionally, the application interface module 76 may be operable to query an application 36 running on the end host 14 and/or a virtual computing instance 68 running on the end host 14. The traffic agent 40 may query the application 36 running on the end host 14 for classification/packet information 50 for a traffic flow from the application 36. The traffic agent 40 may be operable to receive classification/packet information 50 for one or more subject traffic flows from the application 36. The application interface module 76 may further be operable to communicate the packet/classification information 50 to the classification module 60.

Figure 6:
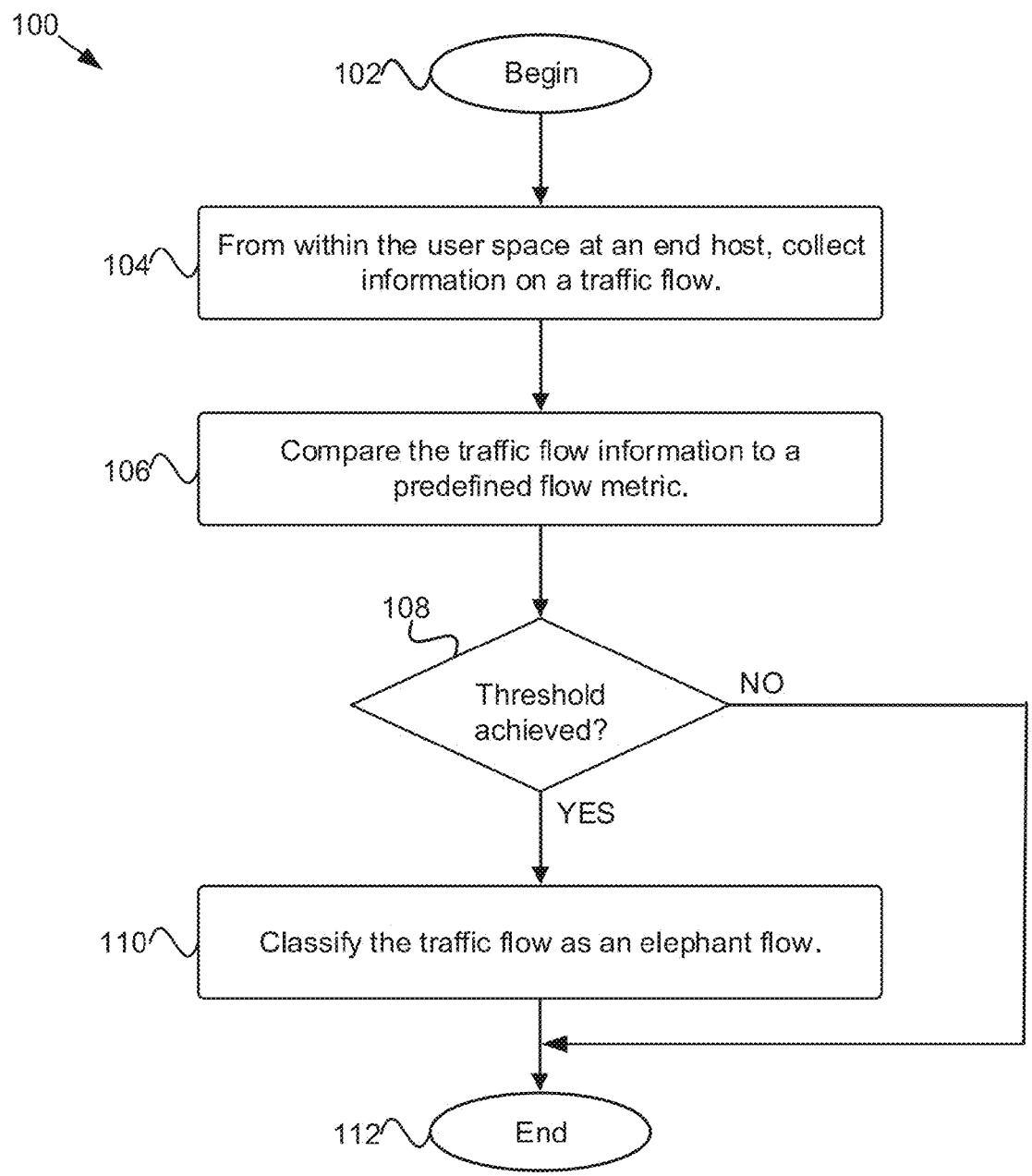
FIG. 6 is a flow chart of methods for classifying a traffic flow as a large flow and/or an elephant flow at an end host connected to a data-center network within the user space and independent of the kernel space of an operating system residing at the end host, in accordance with examples.
Figure 7:
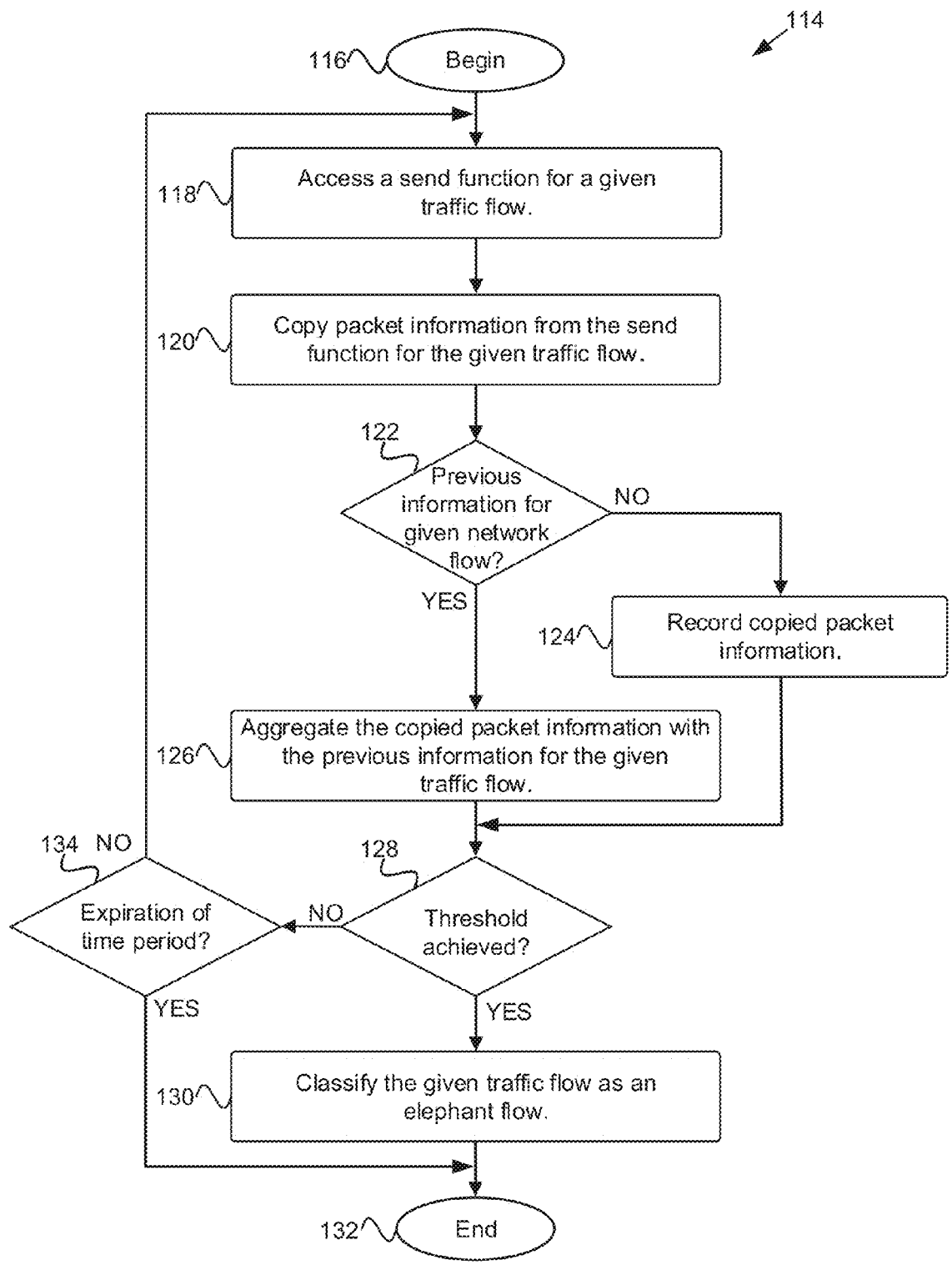
FIG. 7 is a flow chart of methods for collecting and aggregating classification information for classifying a traffic flow as a large flow and/or an elephant flow with a modified send function operable to collect classification information from one or more calls to the send function pertaining to a given traffic flow over a given period of time for classification, in accordance with examples.

Referring to FIG. 6 and FIG. 7, methods 100, 114 are depicted for detecting, identifying, and/or classifying traffic flows. The flowcharts in FIG. 6 and FIG. 7 illustrate the architecture, functionality, and/or operation of possible implementations of systems, methods, and computer program products according to certain embodiments of the present invention. In this regard, each block in the flowcharts may represent a module, segment, or portion of code, which comprises one or more executable instructions for implementing the specified logical function(s). It will also be noted that each block of the flowchart illustrations, and combinations of blocks in the flowchart illustrations, may be implemented by special purpose hardware-based systems that perform the specified functions or acts, or combinations of special purpose hardware and computer instructions.

Where computer program instructions are involved, these computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block-diagram block or blocks.

These computer program instructions may also be stored in a computer readable medium that may direct a computer or other programmable data processing apparatus to function in a particular manner, such that the instructions stored in the computer-readable medium produce an article of manufacture including instruction means which implement the function/act specified in the flowchart and/or block-diagram block or blocks.

The computer program may also be loaded onto a computer or other programmable data processing apparatus to cause a series of operation steps to be performed on the computer or other programmable apparatus to produce a computer implemented process such that the instructions which execute on the computer or other programmable apparatus provide processes for implementing the functions/acts specified in the flowchart and/or block-diagram block or blocks.

Referring to FIG. 6, methods 100 are depicted for classifying a traffic flow as a large flow 16 and/or an elephant flow 16 at an end host 14. Such methods 100 may begin 102 by collecting 104 classification/packet information 50 for a traffic flow. The collection 104 may be performed from within a user space 44 at an end host 14 communicatively coupled to the data-center network 10. Such methods 100 may proceed by comparing 106 the classification/packet information 50 for the traffic flow to one or more values for one or more flow metrics.

A determination 108 may be made as to whether the traffic flow achieves one or more threshold values with respect to the relevant metric value(s). Where the answer to the determination 108 is YES, such methods 110 may classify the traffic flow as a large flow 16 and/or an elephant flow 16 and then end 112. As used herein the phrase to 'achieve a value' may mean to equal that value or be greater than the value in some cases. In other cases, the phrase may mean to equal that value or be less than that value. Where the answer is NO, the methods 100 may end 112. In some examples, however, where the answer is NO, the methods 100 may classify the traffic flows as some other type of flow, such as a mouse flow 18.

Certain examples of the methods 100 may inform classification 110 of one or more traffic flows originating at the end host 14 based on a flow type and/or a-priori information about that flow type. Also, in examples of such methods 100 employed in computing environments involving virtualization, the collection 104 step may involve collecting 104 a set of classification/packet information 50 for each traffic flow of a plurality of traffic flows generated by a plurality of virtualized computing instances 68 residing at the end host 14. In such methods, the comparison 108 step may involve comparing 106 one or more values to of the set of classification information 50 for each traffic flow of the plurality of traffic flows individually to the one or more predefined values for one or more flow metrics. By applying the determination 108 step and/or the classification 110 step, such examples of these methods 100 may classify one or more large traffic flows 16 achieving the flow metric value.

Referring to FIG. 7, methods 114 are depicted for collecting and aggregating packet/classification information 50, with a modified send function 56 over a period of time, for classification of a corresponding traffic flow. Such methods 114 may begin 116 by accessing 118 a send function 56 for a given traffic flow. In such examples, methods 114 may copy/acquire 120 packet/classification information 50 from a call to a send function 56 for a given traffic flow to send frames/packets 22 from the end host 14 over the data-center network 10. Additionally, a library 54 may be provisioned to an end host 14 that may include a send function 56 operable to send frames/packets from a socket at the end host 14 and to copy/capture 120 classification information 50 related to those frames/packets 22.

A determination 122 may be made about whether previous information has been collected and/or copied 120 for the given traffic flow. In such examples, where the answer to the determination 122 is NO, the packet/classification information 50 may be recorded 124. Where that answer to the determination 122 is YES, the copied packet/classification information 50 may be aggregated 126 with the previous information for the given traffic flow. Therefore, packet/classification information 50 pertaining to a common traffic flow may be aggregated 126 for classification analysis.

A determination 128 may be made as to whether a threshold has been achieved by one or more values for the copied packet/classification information 50 and/or previous information with respect to one or more metrics for traffic flows, such as those discussed above. Where the answer to the threshold determination 128 is YES, such methods 114 may classify 130 the given traffic flow as a large flow 16 and/or an elephant flow 16 and the processes 114 may end 132. In certain examples, classification 130 may be informed by classification information 50 of the traffic flow originating at the end host 14 based on information about the traffic flow from an application 36 generating the traffic flow. Where the answer to the determination 128 is NO, yet another determination 134 may be made as to whether a time period for collecting information for the given traffic flow has expired.

Such examples may involve limiting collection of packet/classification information 50 for the given traffic flow for classification of the given traffic flow relative to one or more flow metrics to a set time period. Where the answer to the time-period determination 134 is NO, methods 114 may return to accessing 118 a send function 56 and/or copying 120 packet/classification information 50. Where the answer is YES, and the time period of the given traffic flow has expired, methods 114 may end 132.

In some of such examples, methods 114 may further involve dynamically changing the time period in response to conditions in the data-center network 10. For example, a time period may be increased or decreased to, such as by way of a non-limiting example, according to a machine-learning algorithm, to improve network performance with respect to one or more metrics in response to different load conditions on the data-center network 10.

It should also be noted that, in some alternative implementations, the functions noted in the blocks may occur out of the order noted in the figure. In certain embodiments, two blocks shown in succession may, in fact, be executed substantially concurrently, or the blocks may sometimes be executed in the reverse order, depending upon the functionality involved. Alternatively, certain steps or functions may be omitted if not needed.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

The invention claimed is:

1. A system for classifying traffic flows comprising:
   a traffic agent operable to be deployed at an end host within a user space in physical memory independent of a kernel space of the physical memory, the traffic agent running on the end host comprising the physical memory and a processor, the end host communicatively coupled to a data-center network comprising multiple end hosts and an intermediate network device, the traffic agent further operable to utilize a library within the traffic agent to monitor traffic flows originating at the end host;
   a send function provided with the library operable to send at least one frame/packet pertaining to the individual traffic flow from a socket at the end host;
   a collection module within the traffic agent and operable to collect classification information for at least one traffic flow originating at the end host;
   a classification module within the traffic agent and operable to classify an individual traffic flow from the at least one traffic flow as an elephant flow where at least one value of the classification information for the individual traffic flow exceeds a corresponding threshold value for a flow metric; and
   the collection module comprising a portion of the send function operable to copy the classification information from a call to the send function for classification analysis by the classification module.

2. The system of claim 1, wherein:
   the traffic agent is further operable to monitor multiple virtual computing instances supported by the end host;

the collection module is further operable to collect classification information for individual traffic flows from the multiple virtual computing instances; and the classification module is further operable to compare the classification information collected for the individual traffic flows from the multiple virtual computing instances to the threshold value for the flow metric for individual determinations with respect to the individual traffic flows to classify a subset of the individual traffic flows as at least one elephant flow.

3. The system of claim 1, further comprising an aggregation module within the traffic agent, the aggregation module operable to aggregate multiple sets of classification information for a common traffic flow for analysis by the classification module.

4. The system of claim 1, further comprising a timing module within the traffic agent and communicatively coupled to at least one of the collection module and the classification module, the timing module operable to:

track a timing interval over which classification information is collected by the collection module for the individual traffic flow; and insure that the classification module only considers classification information for the individual traffic flow collected by the collection module during the timing interval.

5. The system of claim 1, further comprising an application interface module within the traffic agent, the application interface module operable to:

extract classification information for a subject traffic flow from a request made to at least one of the end host and a virtual computing instance running on the end host to generate the subject traffic flow; and communicate the classification information to the classification module.

6. The system of claim 1, further comprising a socket intercept module within the collection module, the socket interface module operable to intercept function calls pertaining to a pre-existing socket application programming interface to allow the collection module to copy classification information relevant to the at least one traffic flow.

7. The system of claim 1, wherein the traffic agent is operable to interface with a range of socket types provided by a range of operating systems.

8. A method for detecting large flows in a data-center network comprising:

provisioning a library to an end host communicatively coupled to a data-center network, the library comprising a send function operable to send frames/packets from a socket at the end host and to capture classification information related to the frames/packets;

collecting, from within a user space at the end host, classification information collected by the send function for a traffic flow;

comparing the classification information for the traffic flow to a flow metric value; and classifying the traffic flow as a large flow where a value in the classification information achieves the flow metric value.

9. The method of claim 8, further comprising limiting collection of classification information for the traffic flow for classification relative to the flow metric value to a time period.

10. The method of claim 9, further comprising dynamically changing the time period in response to conditions in the data-center network.

11. The method of claim 8, further comprising acquiring classification information from a call to a send function to send frames/packets from the end host over the data-center network.

12. The method of claim 8, further comprising:

collecting a set of classification information for each traffic flow of a plurality of traffic flows generated by a plurality of virtual computing instances residing at the end host;

comparing at least one value of the set of classification information for each traffic flow of the plurality of traffic flows individually to the flow metric value; and classifying a large flow achieving the flow metric value in the at least one value.

13. The method of claim 8, further comprising informing classification of the traffic flow originating at the end host based on information about the traffic flow from an application generating the traffic flow.

14. The method of claim 8, further comprising aggregating classification information pertaining to a common traffic flow for classification analysis.

15. A system for classifying traffic flows comprising:

an end host communicatively coupled to a data-center network;

an operating system residing at the end host;

a traffic agent residing within a user space at the end host independent of a kernel space of the operating system, a library within the traffic agent;

an altered send function, within the library, the altered send function altered to copy classification information from a call of the send function enabling the traffic agent to:

monitor a traffic flow generated at the end host for a period of time;

compile classification information for the traffic flow;

the traffic agent further operable to:

compare the classification information to a metric value; and classify the traffic flow as an elephant flow where the classification information achieves a predetermined level relative to the metric value.

16. The system of claim 15, further comprising:

multiple virtual computing instances supported at the end host by the operating system; and the traffic agent further operable to monitor a plurality of traffic flows from the multiple virtual computing instances.

17. The system of claim 15, wherein the traffic agent is operable to interface with different operating systems.

* * * * *